(12) United States Patent
Krystad et al.

(10) Patent No.: US 9,377,214 B2
(45) Date of Patent: Jun. 28, 2016

(54) HEATING DEVICE USING PHOTODETECTOR TO DETECT TEMPERATURE AND METHOD FOR PROTECTING THE SAME

(71) Applicant: MPI Corporation, Chu-Pei, Hsinchu Shien (TW)

(72) Inventors: Helge Jacob Krystad, Chu-Pei (TW); Yueh-Ying Lee, Chu-Pei (TW); Ying-Chiao Chang, Chu-Pei (TW)

(73) Assignee: MPI CORPORATION, Chu-Pei, Hsinchu Shien (TW)

( * ) Notice: Subject to any disclaimer, the term of this patent is extended or adjusted under 35 U.S.C. 154(b) by 142 days.

(21) Appl. No.: 14/159,595

(22) Filed: Jan. 21, 2014

(65) Prior Publication Data

US 2015/0204581 A1 Jul. 23, 2015

(51) Int. Cl.
| | |
|---|---|
| *H05B 1/02* | (2006.01) |
| *F24H 9/20* | (2006.01) |
| *F24H 3/00* | (2006.01) |
| *G05D 23/27* | (2006.01) |
| *G01J 1/00* | (2006.01) |

(52) U.S. Cl.
CPC .............. *F24H 9/2071* (2013.01); *F24H 3/002* (2013.01); *G01J 1/00* (2013.01); *G05D 23/27* (2013.01); *F24H 2250/14* (2013.01)

(58) Field of Classification Search
CPC .. F24H 9/2071; H05B 1/0244; H05B 1/0247; H05B 3/0052
USPC ................... 219/502, 494, 497, 501
See application file for complete search history.

(56) References Cited

U.S. PATENT DOCUMENTS

| | | | |
|---|---|---|---|
| 6,775,986 B2 * | 8/2004 | Ganz ...................... | F01D 17/085 60/39.281 |
| 2003/0096302 A1 * | 5/2003 | Yguerabide ......... | C12Q 1/6816 435/7.1 |
| 2007/0281260 A1 * | 12/2007 | McLellan ............... | F23N 5/082 431/79 |
| 2011/0008737 A1 | 1/2011 | McManus et al. | |

FOREIGN PATENT DOCUMENTS

| | | |
|---|---|---|
| CN | 103278183 A | 9/2013 |
| TW | M445261 | 1/2013 |
| TW | M452324 | 5/2013 |

* cited by examiner

*Primary Examiner* — Mark Paschall
(74) *Attorney, Agent, or Firm* — Muncy, Geissler, Olds & Lowe, P.C.

(57) ABSTRACT

A heating device includes a housing having a flow channel, a heater disposed in the flow channel, an optical rod, a light guider and a photodetector. The optical rod has a transparent body, a first end portion, and a second end portion located inside the housing. The light guider is provided at the second end portion for guiding lights emitted by the heater toward the first end portion. The photodetector is located around the first end portion and faces the second end portion for indirectly receiving the lights emitted by the heater to the light guider through the transparent body. The temperature of the heater can be measured efficiently and timely by using the photodetector having a high responding speed, such that an overheat or damage of the heater can be prevented by controlling the heater based on the measured temperature.

18 Claims, 9 Drawing Sheets

HEATING DEVICE USING PHOTODETECTOR TO DETECT TEMPERATURE AND METHOD FOR PROTECTING THE SAME

BACKGROUND OF THE INVENTION

1. Field of the Invention

The present invention relates generally to heating devices and more particularly, to a heating device using a photodetector to detect temperature and a method for protecting the same.

2. Description of the Related Art

A conventional heating device is primarily composed of a housing having a flow channel therein and a heater disposed in the flow channel. When the heating device is in operation, working fluid, which is usually air or inert gas, is introduced into the housing from an entrance of the housing, and then discharged out of the housing from an outlet of the housing through the flow channel. The temperature of the working fluid is raised when the working fluid flows past the heater and takes away the heat generated by the heater. In this way, the heating device can discharge high-temperature working fluid to heat up an object located outside the outlet of the housing.

A temperature sensor such as a thermocouple, a bimetal thermostat and so on is usually disposed around the outlet of the heating device for detecting the temperature of the working fluid discharged by the heating device. The signal of the temperature sensor is sent to a controller for enabling the controller to control the operation of the heater according to the temperature of the working fluid discharged by the heating device. However, if the outlet or the entrance of the heating device is blocked or a device for dispensing the working fluid malfunctions, the heat generated by the heater may not be appropriately taken away by the working fluid of sufficient amount and flow rate, causing increase of the temperature of the heater continuously. In that event, the temperature of the working fluid sensed by the temperature sensor may not raise corresponding to the temperature of the heater so that the controller may have no chance to shut or cool down the heater, resulting in that the heater is liable to be damaged or burned out due to overheat.

In the aforesaid condition, the temperature of the heater raises very fast, especially for the heater having low mass and high power, such as an electric tungsten heater. Therefore, even though a further temperature sensor is disposed in the flow channel of the heating device, the temperature sensor in the flow channel might respond too slow so that the controller may not be able to stop the heater from heating in time before the heater is damaged or burned out due to overheat.

The inventors of the present invention believe and confirm that if the heating device uses a photodetector such as a photodiode to detect the temperature of the heater, the above-mentioned problem can be resolved because of high responding speed of the photodetector. Using the electric signal generated by a photodetector receiving lights from a light source to measure the temperature of the light source is well known for a person skilled in the art. Many applications in this regard have been developed. For example, a related application is disclosed in US Patent Pub. No. US2011/0008737 A1. However, the photodetector is liable to be damaged in high-temperature-variation circumstances. Therefore, in prior arts using a photodetector to detect temperature, instead of being disposed around the light source under detection, the photodetector is spaced away from the light source by a light guider such as a lens, a quartz rod and so on, and receives the lights from the light source through the light guider. In order that the lights from the light source can be transmitted to the photodetector properly, the photodetector is arranged in such a way that the light-receiving portion of the photodetector directly faces the light source through the light guider. Such arrangement may occupy much space, so that it is inapplicable to small sized heating devices due to the difficulty in spatial arrangement.

SUMMARY OF THE INVENTION

The present invention has been accomplished in view of the above-noted circumstances. It is an objective of the present invention to provide a heating device which uses a photodetector with high responding speed to detect the temperature of a heater and is relatively more flexible in spatial arrangement.

To attain the above objective, the present invention provides a heating device which comprises a housing, a heater, an optical rod, a light guider and a photodetector. The housing is provided at an inside thereof with a flow channel for flow of working fluid. The heater is disposed in the flow channel of the housing. The optical rod has a transparent body, a first end portion, and a second end portion opposite to the first end portion and located inside the housing. The light guider is provided at the second end portion of the optical rod and disposed facing the heater for receiving lights emitted by the heater and guiding the lights toward the first end portion of the optical rod. The photodetector is located adjacent to the first end portion of the optical rod and disposed facing the second end portion of the optical rod for indirectly receiving the lights emitted by the heater to the light guider through the transparent body of the optical rod.

It is another objective of the present invention to provide a method for effectively protecting a heating device from overheat.

To attain the above objective, the present invention provides a method for protecting the aforesaid heating device comprising steps of:

(a) measuring a temperature of the heater by using a detection signal of the photodetector; and (b) turning off power supplied to the heater on a condition that the temperature of the heater measured in step (a) is higher than a predetermined threshold.

By means of the design of the present invention, the temperature of the heater can be determined by using the detection signal of the photodetector and can be used as a reference for feedback controlling the operation of the heater so as to protect the heater from overheat. Besides, the photodetector doesn't need to be disposed adjacent to the heater inside the housing, so the problem that the photodetector is liable to be damaged in high-temperature-variation circumstances can be avoided. In addition, the photodetector doesn't need to be arranged facing the heater directly, so the heating device is relatively more flexible in spatial arrangement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

First of all, it is to be mentioned that same reference numerals used in the following preferred embodiments and the appendix drawings designate same or similar elements throughout the specification for the purpose of concise illustration of the present invention. Besides, when it is mentioned that an element is attached to another element, it means that the former element is directly attached to the latter element, or the former element is indirectly attached to the latter element through one or more other elements between aforesaid former and latter elements.

Figure 1:
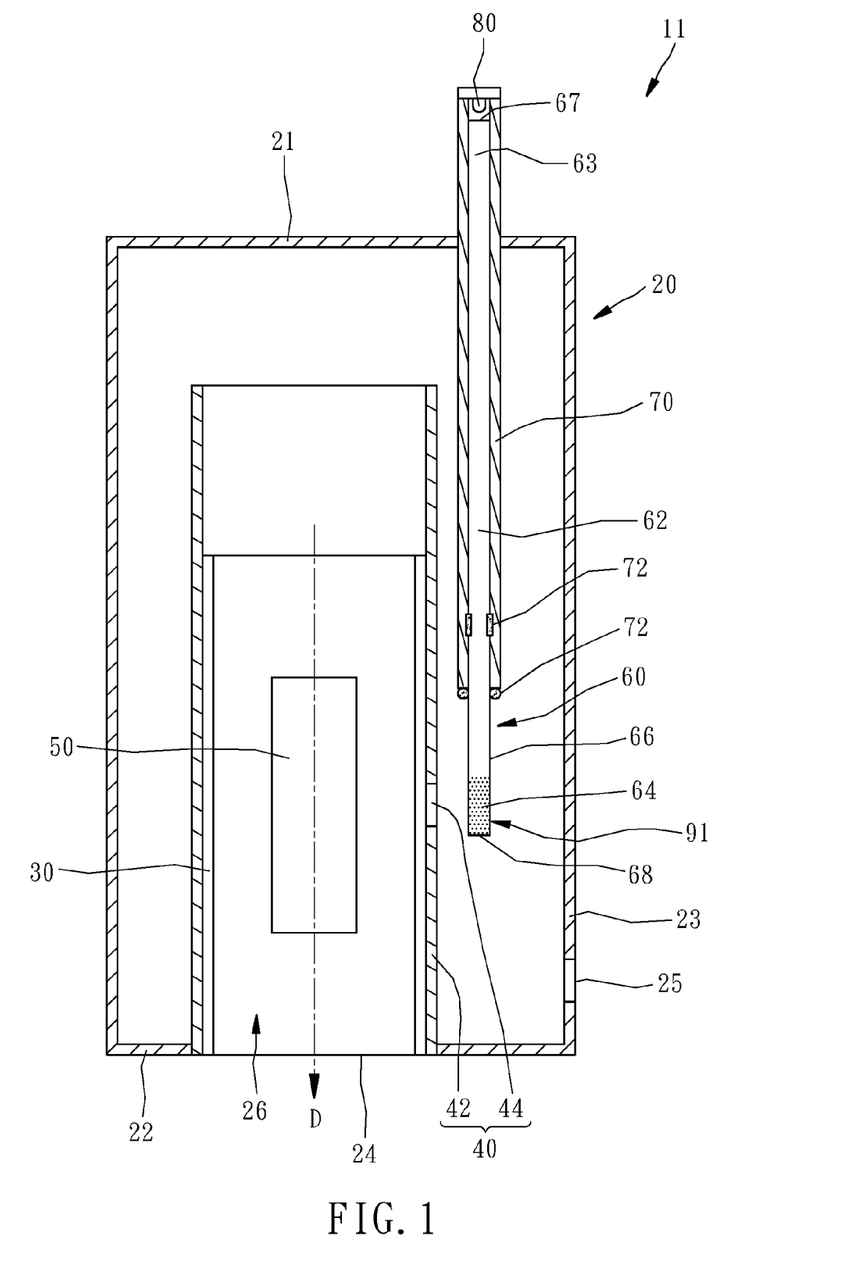
FIG. 1 is a schematic sectional view of a heating device using a photodetector to detect temperature according to a first preferred embodiment of the present invention.

Referring to FIG. 1, a heating device 11 according to a first preferred embodiment of the present invention comprises a housing 20, a transparent pipe 30, an opaque pipe 40, a heater 50, an optical rod 60, a protective pipe 70, a photodetector 80 and a light guider 91.

The housing 20 can be, but not limited to, a hollow cylinder made of stainless steel and having a top portion 21, a bottom portion 22 and a side wall 23. The top portion 21 is penetrated through by the optical rod 60 and the protective pipe 70 in a way that the optical rod 60 held by the protective pipe 70 is stationarily connected to the housing 20. The housing 20 has an outlet 24 and an entrance 25 located at the bottom portion 22 and the side wall 23 respectively, such that working fluid may enter the housing 20 through the entrance 25 and flow out of the housing 20 from the outlet 24. The working fluid may be, but not limited to, air, inert gas or liquid oil.

The transparent pipe 30, the opaque pipe 40 and the heater 50 are disposed inside the housing 20. The transparent pipe 30 can, but not limited to, be made of quartz material. The opaque pipe 40 has a main body 42 made of an opaque material such as stainless steel, and a light transmissible portion 44 made of a transparent material such as glass and embedded in an opening of the main body 42. Alternatively, the light transmissible portion 44 can be configured as an opening provided at the main body 42. The heater 50 may be, but not limited to, an electric tungsten heater having resistance heating coils made of tungsten alloy and having low mass and high power.

The opaque pipe 40 is sleeved onto the transparent pipe 30 and fixed to the bottom portion 22 of the housing 20. The heater 50 is surrounded by the transparent pipe 30 and the opaque pipe 40 and located in a flow channel 26, which is defined as the path along which the working fluid flows inside the housing 20. As shown in FIG. 1, a part of the flow channel 26 is formed by the transparent pipe 30. The outlet 24 of the housing 20 is communicated with the flow channel 26. In this way, before flowing out of the housing 20 from the outlet 24, the working fluid flowing through the flow channel 26 will flow past the heater 50; at the same time, the heat generated by the heater 50 will be taken away by the working fluid, resulting in increase of the temperature of the working fluid. Therefore, the heating device 11 can discharge high-temperature working fluid to heat up an object located outside the outlet 24.

The optical rod 60 has a transparent body 62 which can be, but not limited to, a straight quartz rod provided with a first end portion 63 located outside the housing 20 and a second end portion 64 opposite to the first end portion 63 and located inside the housing 20. The protective pipe 70 may, but not limited to, be made of stainless steel and is sleeved onto the optical rod 60 and fixed to the top portion 21 of the housing 20. As shown in FIG. 1, seals 72, such as O-rings, are respectively provided at the junction between the inner end of the protective pipe 70 and the optical rod 60 and the interface between the inner wall of the protective pipe 70 and the optical rod 60 so as to prevent the working fluid flowing inside the housing 20 from running into the protective pipe and leaking out of the housing 20. As to the photodetector 80, it may be, but not limited to, a photodiode and is attached to an end of the protective pipe 70 and located adjacent to the first end portion 63 of the optical rod 60 outside the housing 20 in such a way that the light-receiving portion (not shown) of the photodiode faces the second end portion 64 of the optical rod 60.

The light guider 91 is provided at the second end portion 64 of the optical rod 60 and disposed facing the heater 50 for receiving lights emitted by the heater 50 and guiding the lights toward the first end portion 63 of the optical rod 60 so that the lights emitted by the heater 50 to the light guider 91 can be received by the photodetector 80 indirectly through the transparent body 62 of the optical rod 60.

In this embodiment, the light guider 91 is an incompletely transparent surface located at the transparent body 62. The incompletely transparent surface 91 may be a rough surface achieved by rubbing the circumference surface of the second end portion 64 of the transparent body 62 with an abrasive material such as sandpaper. Specifically speaking, the optical rod 60 has a circumference surface 66, a first end surface 67 facing the light-receiving portion of the photodetector 80, and a second end surface 68 opposite to the first end surface 67. The incompletely transparent surface 91 is provided at a part of the circumference surface 66 adjacent to the second end surface 68. At least a part of the incompletely transparent surface 91 is aligned with the light transmissible portion 44 of the opaque pipe 40 and the heater 50. In other words, the heater 50 faces the incompletely transparent surface 91 through the transparent pipe 30 and the light transmissible portion 44 of the opaque pipe 40. In this way, the incompletely transparent surface 91 can receive the lights emitted by the heater 50 and the lights streaming on the incompletely transparent surface 91 will be transmitted in the transparent body 62 to the first end surface 67 and then received by the photodetector 80.

Figure 9:
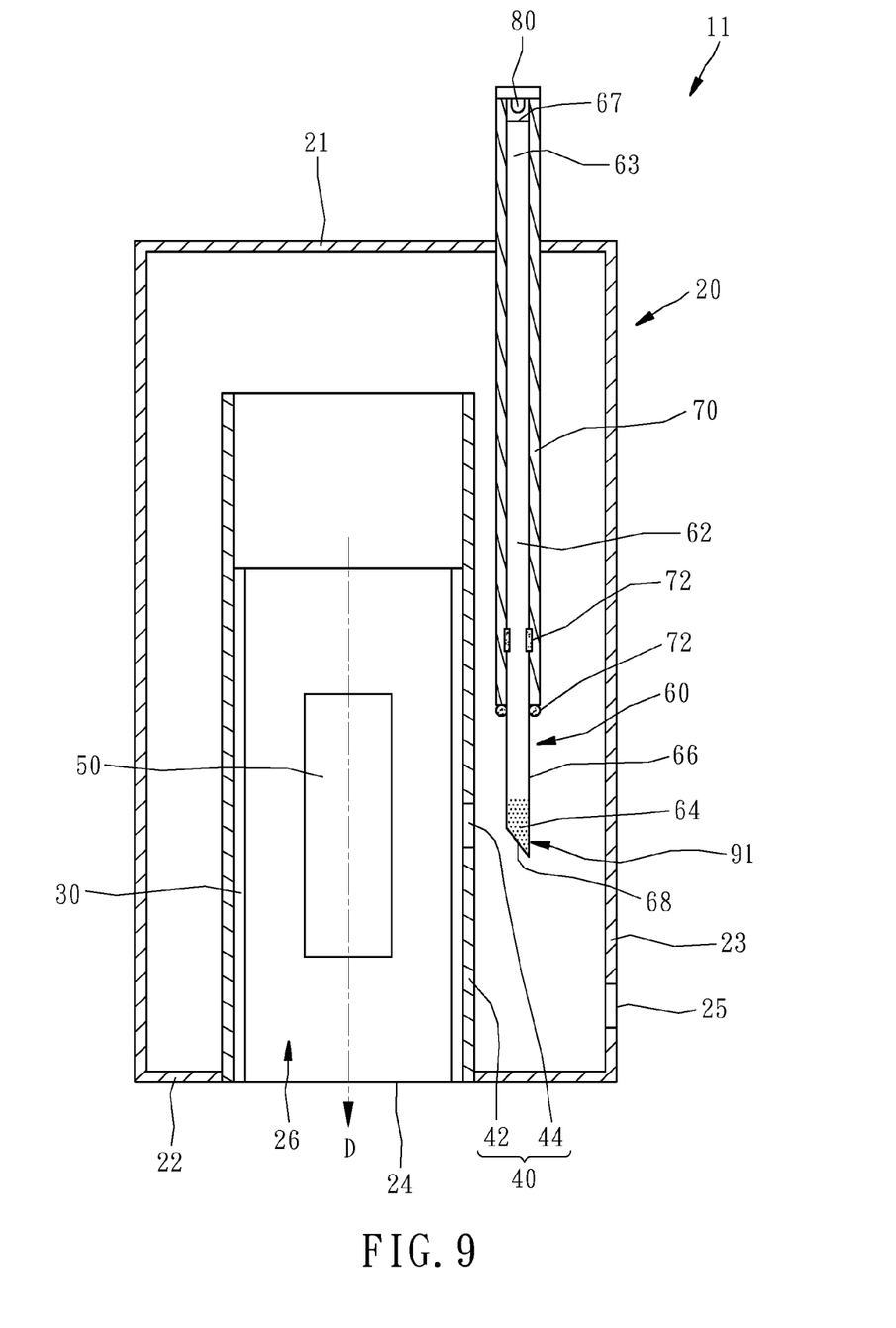
FIG. 9 is similar to FIG. 1 but showing that a second end surface of the optical rod of the heating device is an inclined surface.

In addition to the location mentioned above, the incompletely transparent surface 91 may be additionally provided at the second end surface 68. That is, a part of the incompletely transparent surface 91 is located at the circumference surface 66 and the other part of the incompletely transparent surface 91 is located at the second end surface 68 for preventing the incident light from leaking therefrom. In an alternate form, as shown in FIG. 9, the second end surface 68 is configured as an inclined surface relative to the circumference surface 66 and facing the heater 50, such that the part of the incompletely transparent surface 91 that is located at the inclined second end surface 68 can also receive the lights emitted by the heater 50. Further, it is to be understood that the incompletely transparent surface may be entirely provided at the inclined second send surface that faces the heater, such that the lights emitted by the heater can also be received by the incompletely transparent surface that is solely located at the inclined second end surface.

Because the wavelength of the lights emitted by the heater 50 varies with the operating temperature of the heater 50, the detection signal of the photodetector 80 can be sent to a controller (not shown) for calculating the temperature of the heater 50. Since the aforesaid way of determining the temperature of the heater by using the detection signal of the photodetector is a well-known prior art, no detailed description in this regard is necessarily presented hereunder. To protect the heater 50 from damage due to overheat, as soon as the temperature of the heater 50 determined based on the detection signal of the photodetector 80 is higher than a predetermined threshold the controller is programmed to turn off power supplied to the heater 50 automatically. Usually, the upper limit of safe operating temperature range of the heater 50 is set as the predetermined threshold.

Because the photodetector 80 responds very fast, using the detection signal of the photodetector 80 to feedback control the operation of the heater 50 can effectively protect the heater 50 from damage or burning out due to overheat. Besides, the photodetector 80 receives the lights emitted by the heater 50 indirectly through the optical rod 60, so the photodetector 80 doesn't need to be disposed adjacent to the heater 50 so that the problem that the photodetector 80 is liable to be damaged in high-temperature-variation circumstances can be avoided.

It is more important that the incompletely transparent surface 91 helps the lights emitted by the heater 50 to stay in the transparent body 62 and be transmitted to the photodetector 80. Therefore, the optical rod 60 doesn't need to be disposed in a way that the second end surface 68 faces the heater 50, which in turn causes the photodetector 80 facing the first end surface 67 to face the heater 50 directly for receiving the lights emitted by the heater 50. In other words, the photodetector 80 doesn't need to face the heater 50 directly, so the way that the optical rod 60 is disposed can be properly arranged according to requirements so that the heating device 11 is relatively more flexible in spatial arrangement.

In fact, the working fluid will flow past the heater 50 substantially along a flowing direction D defined by the flow channel 26 of the housing and passing through the heater, so the housing 20 is configured as an elongated cylinder extending along the flowing direction D. In this embodiment, the optical rod 60 is a straight rod having a longitudinal axis and disposed in a way that the longitudinal axis of the optical rod 60 is substantially parallel to the flowing direction D. In this way, the volume of the heating device 11 can be minimized to a desired extent even though a long optical rod 60 is equipped in the heating device 11.

It will be appreciated that the heating device of the present invention can be provided without such protective pipe 70 that is sleeved onto the optical rod 60 as illustrated before. However, in the design with the protective pipe 70, the optical rod 60 is well protected and less damageable and it is convenient to fix the optical rod 60 to the housing 20 and install the photodetector 80. Besides, the incompletely transparent surface 91 is not limited to the rough surface and the position thereof is unlimited, as long as the lights emitted by the heater 50 can be transmitted in the transparent body 62 by means of the incompletely transparent surface 91, instead of passing through the optical rod 60 directly. However, the design that the incompletely transparent surface 91 is provided adjacent to the second end surface 68 of the optical rod 60 is optimal and convenient to align the incompletely transparent surface 91 with the light transmissible portion 44 of the opaque pipe 40 and the heater 50 accurately and helps to minimize the length of the optical rod 60.

Figure 2:
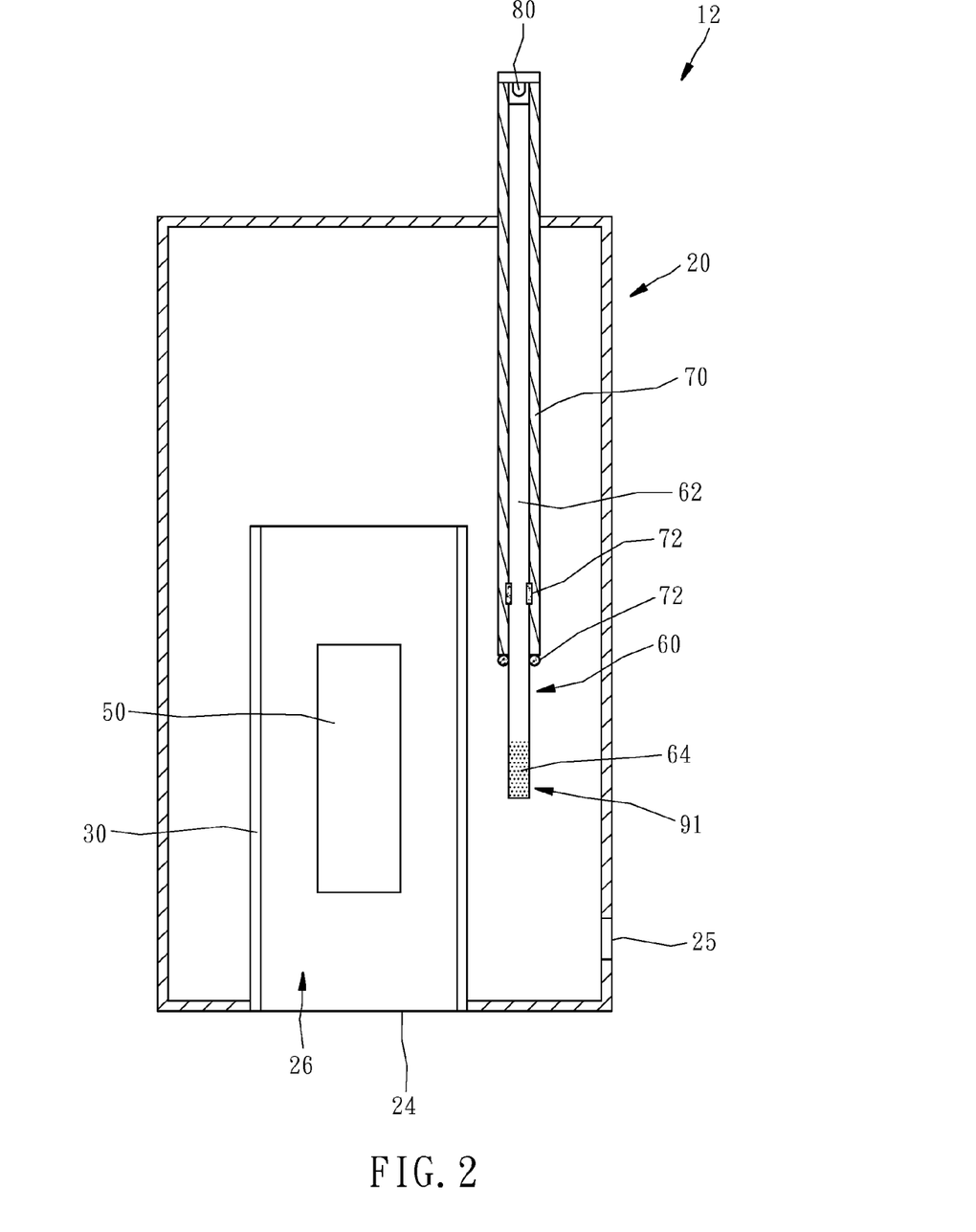
FIG. 2 is a schematic sectional view of a heating device using a photodetector to detect temperature according to a second preferred embodiment of the present invention.

As shown in FIG. 2, a heating device 12 according to a second preferred embodiment of the present invention is provided without the opaque pipe 40 illustrated in the aforesaid first preferred embodiment. However, in the design with the opaque pipe 40 as shown in the first embodiment, the transparent pipe 30 is well protected and less damageable and convenient to be fixed to the housing 20.

Figure 3:
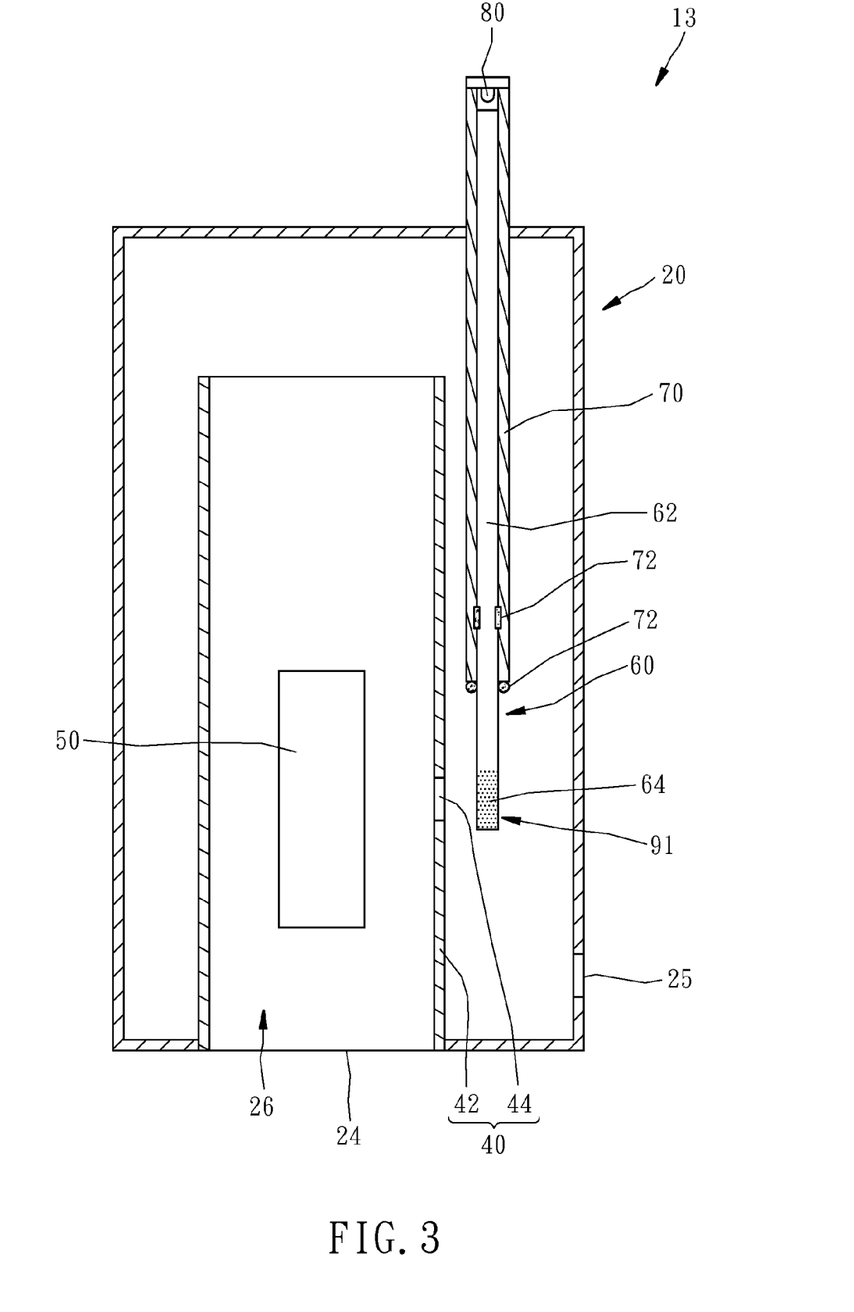
FIG. 3 is a schematic sectional view of a heating device using a photodetector to detect temperature according to a third preferred embodiment of the present invention.
Figure 4:
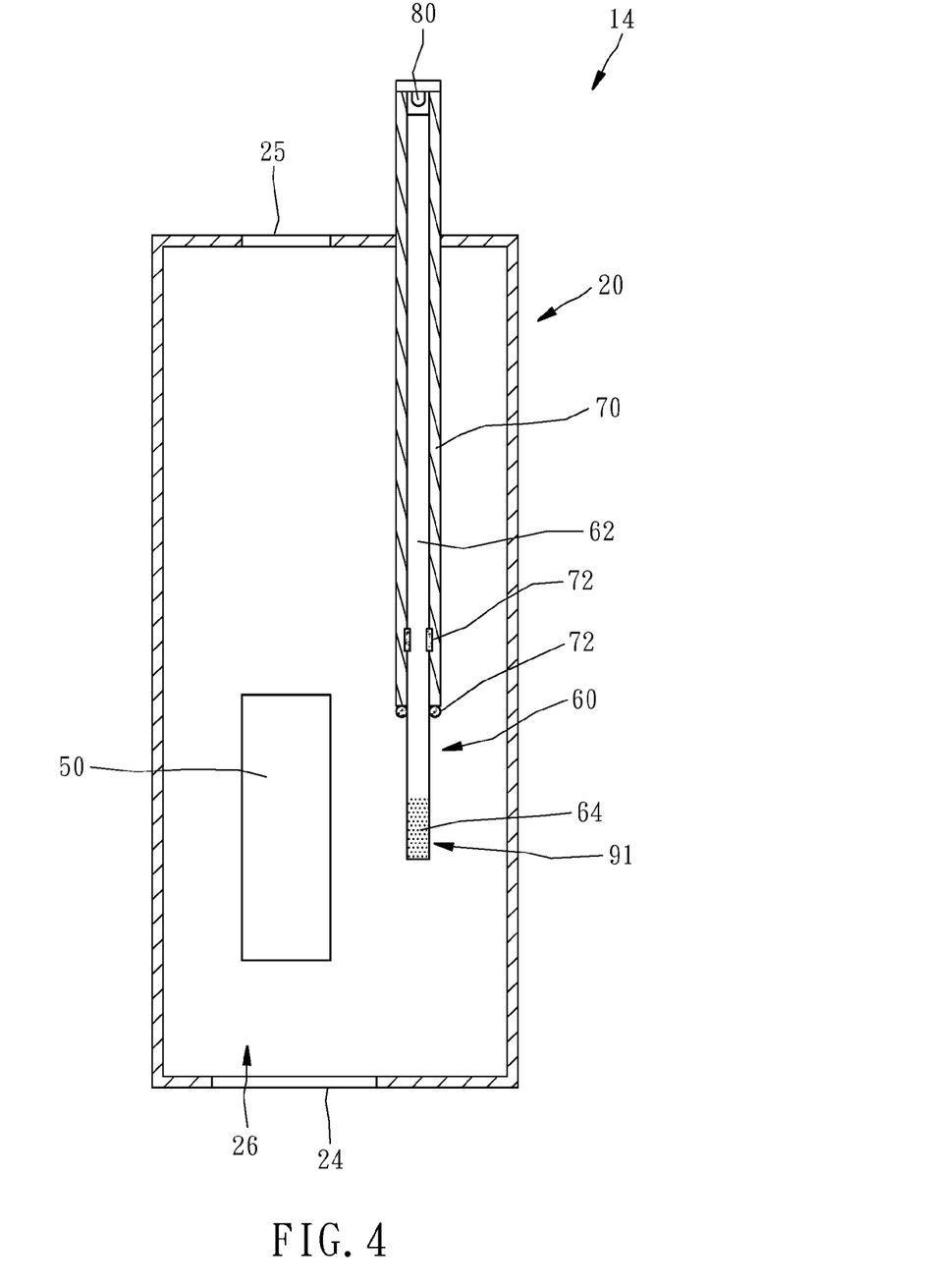
FIG. 4 is a schematic sectional view of a heating device using a photodetector to detect temperature according to a fourth preferred embodiment of the present invention.

As shown in FIG. 3, a heating device 13 according to a third preferred embodiment of the present invention is provided without the transparent pipe 30 illustrated in the aforesaid first preferred embodiment; in this case, a part of the flow channel 26 is formed by the opaque pipe 40. Alternatively, as shown in FIG. 4, a heating device 14 according to a fourth preferred embodiment of the present invention is provided without such transparent pipe 30 and opaque pipe 40 as illustrated before; in this case, the flow channel 26 is formed by the housing 20 itself and the second end portion 64 of the optical rod 60 is located in the flow channel 26.

Figure 5:
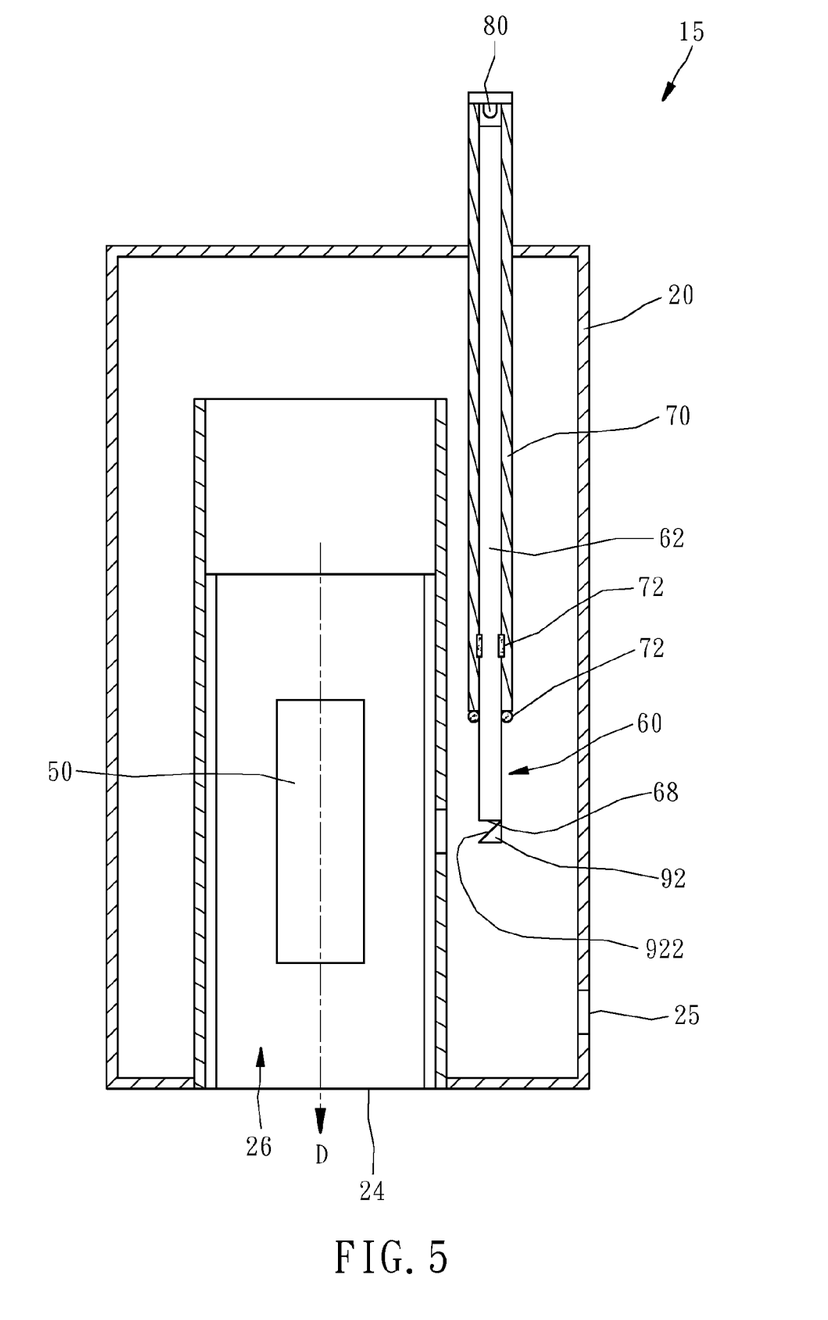
FIG. 5 is a schematic sectional view of a heating device using a photodetector to detect temperature according to a fifth preferred embodiment of the present invention.
Figure 6:
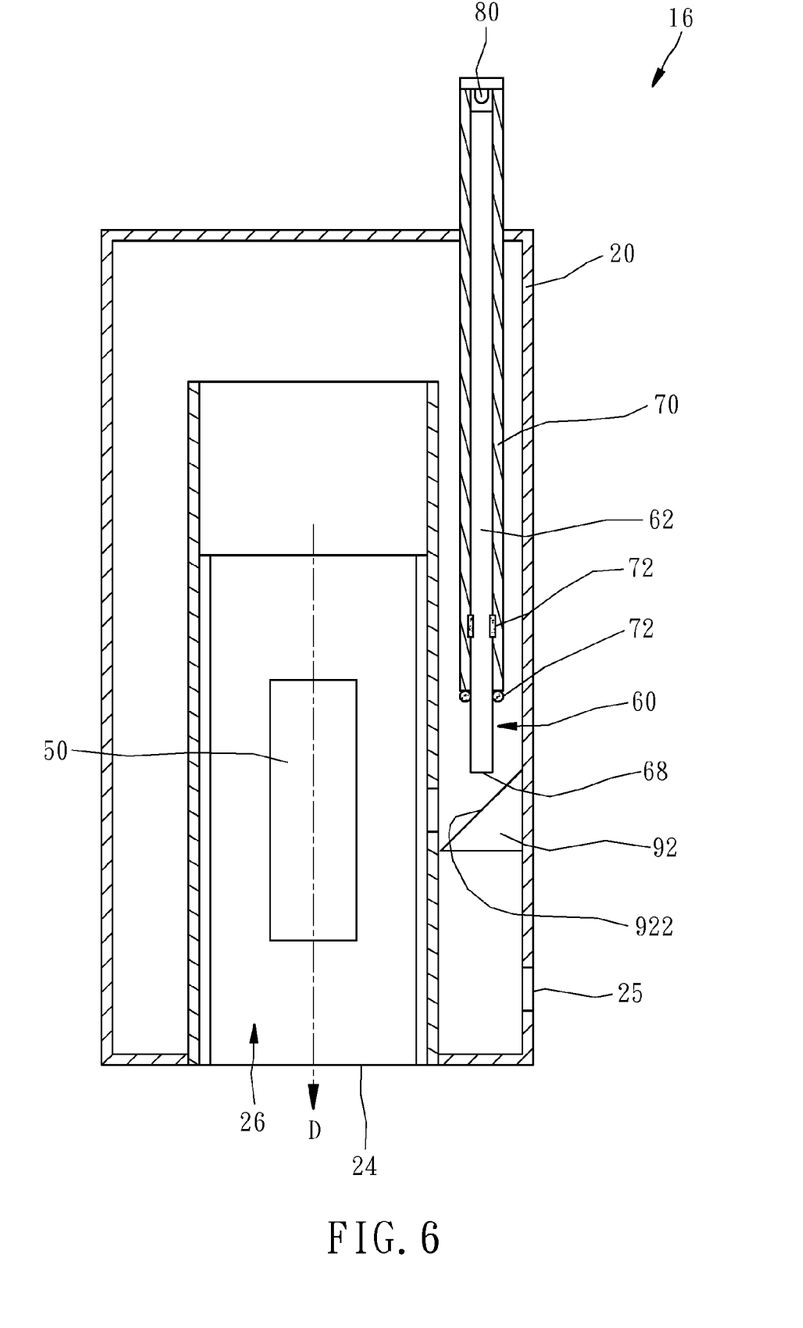
FIG. 6 is a schematic sectional view of a heating device using a photodetector to detect temperature according to a sixth preferred embodiment of the present invention.

Referring to FIGS. 5-6 which show heating device 15, 16 according to fifth and sixth preferred embodiments of the present invention respectively, the heating devices 15, 16 differ from the aforesaid heating device 11 of the first preferred embodiment in configuration of the light guider 92.

In the heating devices 15, 16, the light guider 92 is a prism reflector having a reflecting surface 922 facing the heater 50 and the second end surface 68 of the optical rod 60 simultaneously. The reflecting surface 922 is adapted for reflecting the lights emitted by the heater 50 to the second end surface 68 so that the photodetector 80 can indirectly receive the lights emitted by the heater 50 through the transparent body 62 of the optical rod 60. As shown in FIG. 5, the reflector 92 can be fixed to the second end portion of the optical rod 60. FIG. 5 schematically shows that the reflector 92 is connected with the optical rod 60; in practice, connection between the reflector 92 and the optical rod 60 can be achieved by any conventional connecting way, such as using fasteners or clamping elements. Alternatively, the reflector 92 can be fixed to the protective pipe 70 or the housing 20. FIG. 6 shows an example that the reflector 92 is fixed to an inner surface of the housing 20 and located adjacent to the second surface 68 of the optical rod 60.

Figure 7:
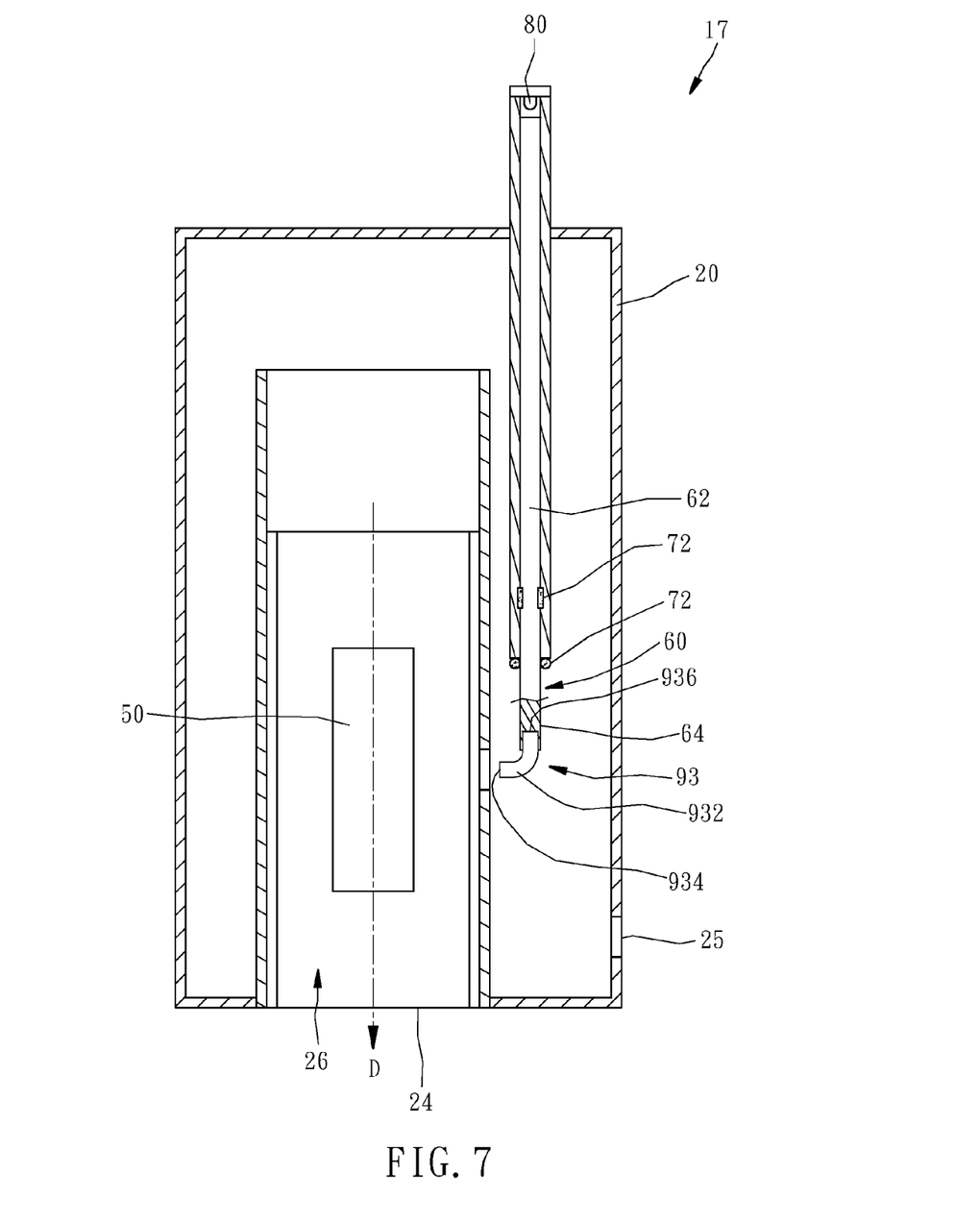
FIG. 7 is a schematic sectional view of a heating device using a photodetector to detect temperature according to a seventh preferred embodiment of the present invention.
Figure 8:
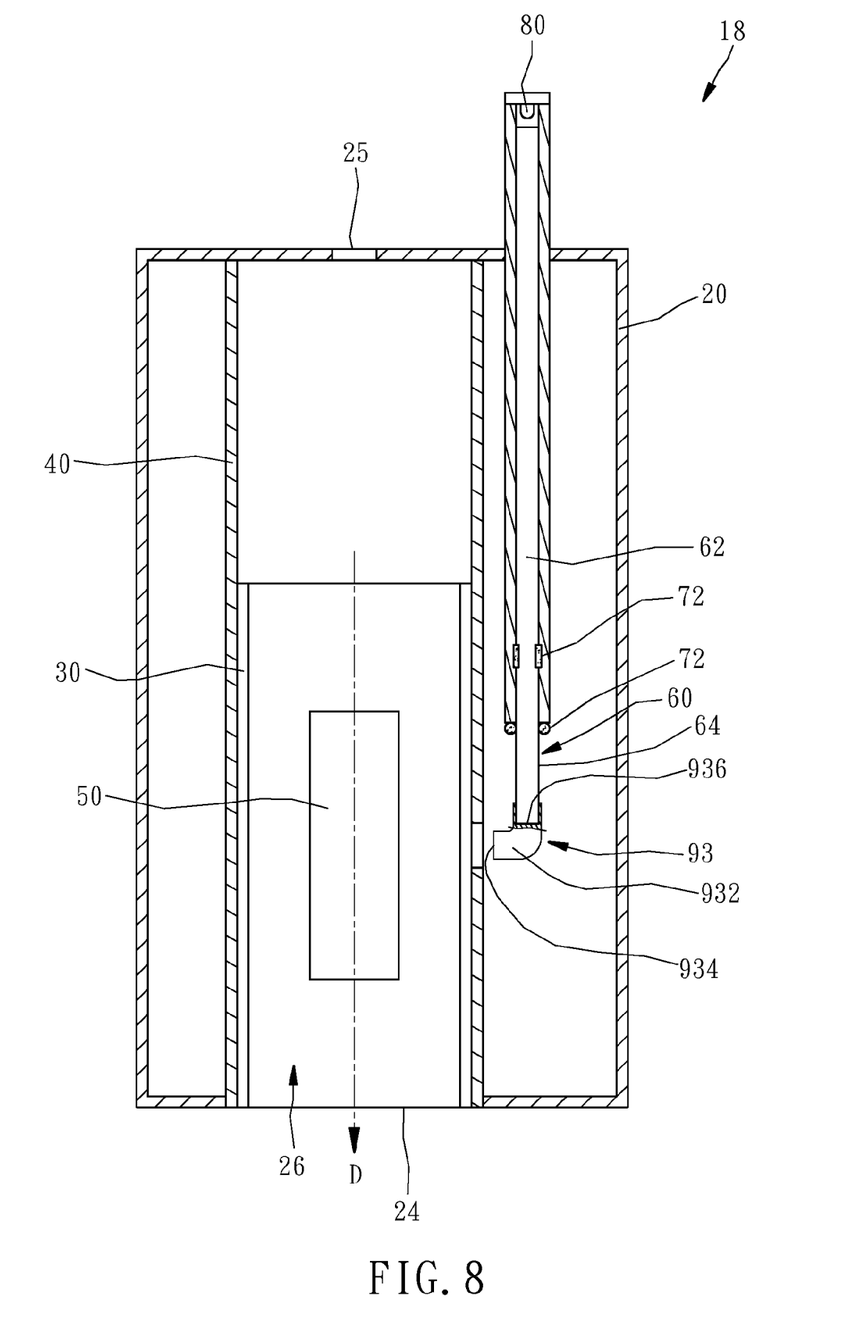
FIG. 8 is a schematic sectional view of a heating device using a photodetector to detect temperature according to an eighth preferred embodiment of the present invention.

Referring to FIGS. 7-8 which show heating devices 17, 18 according to seventh and eighth preferred embodiments of the present invention respectively, the heating devices 17, 18 differ from the aforesaid heating device 11 of the first preferred embodiment in configuration of the light guider 93.

In the heating devices 17, 18, the light guider 93 has a bent transparent body 932 which can be, but not limited to, an L-shaped quartz rod. The light guider 93 has a receiving surface 934 and an emitting surface 936 located at two ends of the bent transparent body 932, respectively. The receiving surface 934 is disposed facing the heater 50. The emitting surface 936 is disposed facing the optical rod 60 and substantially perpendicular to the longitudinal axis of the optical rod 60. In this way, the lights emitted by the heater 50 can be received by the receiving surface 934 and guided to the emitting surface 936 by the bent transparent body 932. Thereafter, the lights emitted by the heater 50 can be emitted from the emitting surface 936 to the optical rod 60 so that the photodetector 80 can indirectly receive the lights emitted by the heater 50 through the transparent body 62 of the optical rod 60. The light guider 93 can be inserted into the second end portion 64 of the optical rod 60, as shown in FIG. 7. Alternatively, the light guider 93 can be sleeved onto the second end portion 64 of the optical rod 60, as shown in FIG. 8. Or, the light guider 93 can be attached to the optical rod 60 in any appropriate ways.

It will be appreciated that in the aforesaid first to seventh preferred embodiments, the working fluid flowing in the housing 20 will flow past the second end portion 64 of the optical rod 60; this means the second end portion 64 is located in the flow channel 26. However, the second end portion 64 of the optical rod 60 can also be absent from the flow channel 26, as shown in FIG. 8.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heating device comprising:
   a housing provided at an inside thereof with a flow channel for flow of working fluid;
   an electric heater disposed in the flow channel and being capable of emitting lights;
   an optical rod having a transparent body, a first end portion, and a second end portion opposite to the first end portion and located inside the housing;
   a light guider provided at the second end portion of the optical rod and facing the electric heater for receiving the lights emitted by the electric heater and guiding the lights toward the first end portion of the optical rod; and
   a photodetector located adjacent to the first end portion of the optical rod and facing the second end portion of the optical rod for indirectly receiving the lights emitted by the electric heater to the light guider through the transparent body of the optical rod and generating a detection signal corresponding to a temperature of electric heater.

2. The heating device as claimed in claim 1, wherein the light guider is a translucent surface provided at the transparent body.

3. The heating device as claimed in claim 2, wherein the translucent surface is a rough surface.

4. The heating device as claimed in claim 2, wherein the optical rod has a circumference surface, a first end surface, and a second end surface opposite to the first end surface; the translucent surface is provided at a part of the circumference surface adjacent to the second end surface; the photodetector is located adjacent to and facing the first end surface.

5. The heating device as claimed in claim 4, wherein the translucent surface is further provided at the second end surface.

6. The heating device as claimed in claim 5, wherein the second end surface is configured as an inclined surface relative to the circumference surface.

7. The heating device as claimed in claim 2, wherein the optical rod has a circumference surface, a first end surface, and a second end surface opposite to the first end surface; the second end surface is configured as an inclined surface relative to the circumference surface; the translucent surface is provided at the second end surface; the photodetector is located adjacent to and facing the first end surface.

8. The heating device as claimed in claim 1, wherein the light guider is a reflector for reflecting the lights emitted by the electric heater to the optical rod.

9. The heating device as claimed in claim 1, wherein the light guider comprises a bent transparent body, and a receiving surface and an emitting surface located at two ends of the bent transparent body respectively; the receiving surface faces the electric heater; the emitting surface faces the optical rod and is substantially perpendicular to a longitudinal axis of the optical rod.

10. The heating device as claimed in claim 1, wherein the second end portion of the optical rod is located in the flow channel.

11. The heating device as claimed in claim 1, further comprising a protective pipe sleeved onto the optical rod.

12. The heating device as claimed in claim 1, wherein the flow channel is defined with a flowing direction along which the working fluid flows past the electric heater; the optical rod is a straight rod having a longitudinal axis substantially parallel to the flowing direction.

13. The heating device as claimed in claim 1, wherein the housing has a top portion penetrated by the optical rod, and a bottom portion provided with an outlet communicated with the flow channel.

14. The heating device as claimed in claim 1, further comprising an opaque pipe surrounding the electric heater and having a light transmissible portion; wherein the light guider faces the electric heater through the light transmissible portion of the opaque pipe.

15. The heating device as claimed in claim 14, further comprising a transparent pipe located between the electric heater and the opaque pipe.

16. The heating device as claimed in claim 1, further comprising a transparent pipe surrounding the electric heater; wherein the light guider faces the electric heater through the transparent pipe.

17. The heating device as claimed in claim 1, wherein the first end portion is located outside the housing.

18. A method for protecting the heating device as claimed in claim 1 comprising steps of:
   (a) measuring a temperature of the electric heater by using a controller receiving a detection signal of the photodetector; and
   (b) turning off power supplied to the electric heater by the controller on a condition that the temperature of the electric heater measured in step (a) is higher than a predetermined threshold.

* * * * *